(12) United States Patent
Holl

(10) Patent No.: US 6,994,330 B2
(45) Date of Patent: Feb. 7, 2006

(54) PROCESS FOR HIGH SHEAR GAS-LIQUID REACTIONS

(75) Inventor: Richard A. Holl, Oxnard, CA (US)

(73) Assignee: Kriedo Laboratories, Camarillo, CA (US)

( * ) Notice: Subject to any disclaimer, the term of this patent is extended or adjusted under 35 U.S.C. 154(b) by 0 days.

(21) Appl. No.: 10/857,305

(22) Filed: May 28, 2004

(65) Prior Publication Data

US 2004/0222536 A1 Nov. 11, 2004

Related U.S. Application Data

(60) Division of application No. 09/894,996, filed on Jun. 27, 2001, now Pat. No. 6,742,774, said application No. 09/894,996 and a continuation-in-part of application No. 09/853,448, filed on May 10, 2001, now Pat. No. 6,723,999, and a continuation-in-part of application No. 09/802,037, filed on Mar. 7, 2001, now Pat. No. 6,471,392, and a continuation-in-part of application No. 09/345,813, filed on Jul. 2, 1999, now Pat. No. 6,391,082.

(60) Provisional application No. 60/214,538, filed on Jun. 27, 2000.

(51) Int. Cl.
*B01F 3/04* (2006.01)
(52) U.S. Cl. .......................... 261/92; 366/279
(58) Field of Classification Search ................ 261/83, 261/92; 366/279; 250/438
See application file for complete search history.

(56) References Cited

U.S. PATENT DOCUMENTS 591,494 A 10/1897 Pond 2,261,257 A * 11/1941 Kiesskalt et al. ............. 366/79
2,295,740 A 9/1942 Keen ............................ 261/93
2,314,598 A 3/1943 Phelan ........................ 62/114
2,474,006 A 6/1949 Maycock ..................... 261/83
2,577,247 A * 12/1951 Irwin ......................... 426/247
3,095,349 A 6/1963 Rich ........................... 162/236
3,215,642 A * 11/1965 Levy ........................... 261/83
3,595,531 A 7/1971 Williams et al. .............. 259/7
3,841,814 A * 10/1974 Eckhardt ..................... 425/208
3,870,082 A 3/1975 Holl ............................ 138/40
4,000,993 A 1/1977 Holl ............................. 55/94
4,057,331 A 11/1977 Ong et al. .................. 350/285

(Continued)

FOREIGN PATENT DOCUMENTS

DE 299 02 348 4/1999

(Continued)

OTHER PUBLICATIONS

PCT International Search Report for PCT/US00/18038, Holl Technologies Company, completed Sep. 17, 2000, mailed Oct. 6, 2000.

(Continued)

*Primary Examiner*—Scott Bushey
(74) *Attorney, Agent, or Firm*—Christopher Darrow; Peter Jon Gluck; Greenberg Traurig LLP

(57) ABSTRACT

A reactor produces a gas-in-liquid emulsion for providing increased interfacial contact area between the liquid and the gas for improved reaction of the gas with the liquid, or more rapid solution or reaction of a difficulty to dissolve or immiscible gas in or with a liquid. The reactor is suitable for a continuous or batch type process. Rotor and stator cylindrical members are mounted for relative rotation one to the other and have opposing surfaces spaced to form an annular processing passage. The gap distance between the opposing surfaces and the relative rotation rate of the cylindrical members are such as to cause formation of a gas-in-liquid emulsion of the gas in the liquid, as the liquid and gas pass through the processing passage.

2 Claims, 3 Drawing Sheets

U.S. PATENT DOCUMENTS

| | | | |
|---|---|---|---|
| 4,071,225 A | 1/1978 | Holl | 366/114 |
| 4,073,567 A | 2/1978 | Lakerveld et al. | 350/6.5 |
| 4,174,907 A * | 11/1979 | Suh et al. | 366/279 |
| 4,198,383 A | 4/1980 | Konsetov et al. | 422/134 |
| 4,251,576 A | 2/1981 | Osborn et al. | 428/331 |
| 4,287,075 A | 9/1981 | Fujiwara et al. | 501/135 |
| 4,306,165 A | 12/1981 | Kitabayashi et al. | 310/59 |
| 4,311,570 A | 1/1982 | Cowen et al. | 204/157.1 |
| 4,315,172 A | 2/1982 | Intichar et al. | 310/53 |
| 4,335,180 A | 6/1982 | Traut | 428/303 |
| 4,405,491 A * | 9/1983 | Sando et al. | 261/83 |
| 4,556,467 A | 12/1985 | Kuhn et al. | 241/193 |
| 4,593,754 A | 6/1986 | Holl | 165/109.1 |
| 4,670,103 A | 6/1987 | Holl | 165/109.1 |
| 4,708,198 A | 11/1987 | Holl | 165/109.1 |
| 4,744,521 A | 5/1988 | Singer et al. | 241/66 |
| 4,769,131 A | 9/1988 | Noll et al. | 210/85 |
| 4,778,631 A * | 10/1988 | Cobbs et al. | 261/128 |
| 4,784,218 A | 11/1988 | Holl | 165/109.1 |
| 4,889,909 A | 12/1989 | Besecke et al. | 528/125 |
| 4,921,473 A | 5/1990 | Lee et al. | 494/27 |
| 4,930,708 A | 6/1990 | Chen | 241/65 |
| 4,983,307 A | 1/1991 | Nesathurai | 210/748 |
| 5,154,973 A | 10/1992 | Imagawa et al. | 428/325 |
| 5,198,137 A | 3/1993 | Rutz et al. | 252/62.54 |
| 5,204,416 A | 4/1993 | Mercer et al. | 525/390 |
| 5,212,278 A | 5/1993 | Pfandner | 528/171 |
| 5,227,637 A | 7/1993 | Herold et al. | 250/438 |
| 5,268,140 A | 12/1993 | Rutz et al. | 75/246 |
| 5,279,463 A * | 1/1994 | Holl | 241/1 |
| 5,300,019 A | 4/1994 | Bischof et al. | 604/4 |
| 5,335,992 A | 8/1994 | Holl | 366/348 |
| 5,358,775 A | 10/1994 | Horn, III | 428/209 |
| 5,370,824 A * | 12/1994 | Nagano et al. | 516/69 |
| 5,370,999 A | 12/1994 | Stuart | 435/99 |
| 5,391,603 A | 2/1995 | Wessel et al. | 524/396 |
| 5,395,914 A | 3/1995 | Wilharm et al. | 528/125 |
| 5,449,652 A | 9/1995 | Swartz et al. | 501/134 |
| 5,471,037 A | 11/1995 | Goethel et al. | 219/750 |
| 5,484,647 A | 1/1996 | Nakatani et al. | 428/209 |
| 5,506,049 A | 4/1996 | Swei et al. | 428/323 |
| 5,523,169 A | 6/1996 | Rafferty et al. | 428/551 |
| 5,538,191 A * | 7/1996 | Holl | 241/1 |
| 5,552,210 A | 9/1996 | Horn, III et al. | 428/209 |
| 5,554,323 A | 9/1996 | Tsukimi et al. | 264/4.7 |
| 5,558,820 A | 9/1996 | Nagano et al. | 264/4.1 |
| 5,576,386 A | 11/1996 | Kempter et al. | 526/88 |
| 5,658,485 A | 8/1997 | Cava et al. | 252/62.9 |
| 5,658,994 A | 8/1997 | Burgoyne, Jr. et al. | 525/390 |
| 5,659,006 A | 8/1997 | White | 528/212 |
| 5,674,004 A | 10/1997 | Takeuchi | 366/69 |
| 5,693,742 A | 12/1997 | White et al. | 528/212 |
| 5,739,193 A | 4/1998 | Walpita et al. | 524/413 |
| 5,754,936 A | 5/1998 | Jansson | 419/10 |
| 5,855,865 A | 1/1999 | Lambert et al. | 424/9.52 |
| 5,874,516 A | 2/1999 | Burgoyne, Jr. et al. | 528/219 |
| 5,929,138 A | 7/1999 | Mercer et al. | 523/220 |
| 5,974,867 A | 11/1999 | Forster et al. | 73/61.41 |
| 5,998,533 A | 12/1999 | Weber et al. | 524/540 |
| 6,039,784 A | 3/2000 | Luk | 75/231 |
| 6,040,935 A | 3/2000 | Michalicek | 359/198 |
| 6,074,472 A | 6/2000 | Jachow et al. | 106/436 |
| 6,093,636 A | 7/2000 | Carter et al. | 438/623 |
| 6,134,950 A | 10/2000 | Forster et al. | 73/54.01 |
| 6,143,052 A | 11/2000 | Kiyokawa et al. | 75/230 |
| 6,176,991 B1 | 1/2001 | Nordman | 204/601 |
| 6,190,034 B1 | 2/2001 | Nielsen et al. | 366/336 |
| 6,281,433 B1 | 8/2001 | Decker et al. | 174/35 |
| 6,391,082 B1 * | 5/2002 | Holl | 75/230 |
| 6,464,936 B1 | 10/2002 | Mowat et al. | 422/22 |
| 6,471,392 B1 * | 10/2002 | Holl et al. | 366/279 |
| 6,742,774 B2 * | 6/2004 | Holl | 261/83 |
| 6,752,529 B2 * | 6/2004 | Holl | 366/279 |
| 2001/0030295 A1 | 10/2001 | Holl | 250/492.23 |
| 2002/0038582 A1 | 4/2002 | Holl | 75/230 |
| 2002/0078793 A1 | 6/2002 | Holl | 75/230 |
| 2002/0089074 A1 | 7/2002 | Holl | 261/92 |
| 2002/0148640 A1 | 10/2002 | Holl | 174/256 |
| 2003/0043690 A1 | 3/2003 | Holl | 366/279 |
| 2003/0066624 A1 | 4/2003 | Holl | 165/47 |

FOREIGN PATENT DOCUMENTS

| | | | |
|---|---|---|---|
| DE | 299 19 570 | 1/2000 | |
| EP | 0 219 357 | 4/1987 | |
| EP | 0 660 336 | 6/1995 | |
| GB | 891 152 | 3/1962 | |
| GB | 1 232 644 | 5/1971 | |
| GB | 1 252 192 | 11/1971 | |
| GB | 2 192 558 | 1/1988 | |
| JP | 58 144549 | 8/1983 | |
| JP | 3 279991 | 12/1991 | |
| JP | 11322920 | 11/1999 | |
| JP | 2000-213876 | 8/2000 | |
| SU | 369 939 | 4/1973 | 241/1 |
| SU | 957 991 | 9/1982 | 241/301 |
| SU | 1 737 241 | 5/1992 | |
| WO | WO 97 12665 | 4/1997 | |
| WO | WO 97 42639 | 11/1997 | |
| WO | WO 98 49675 | 11/1998 | |
| WO | WO 02 071451 | 9/2002 | |
| WO | WO 03 022415 | 3/2003 | |

OTHER PUBLICATIONS

PCT International Search Report for PCT/US01/15258, Holl Technologies Company, completed Jan. 24, 2002, mailed Feb. 1, 2002.

PCT International Search Report for PCT/US01/20635, Holl Technologies Company, completed Jan. 24, 2002, mailed Feb. 1, 2002.

PCT International Search Report for PCT/US01/23657, Holl Technologies Company, completed Apr. 25, 2002, mailed May 6, 2002.

PCT International Search Report for PCT/US02/11575, Holl Technologies Company, completed Jul. 12, 2002, mailed Aug. 6, 2002.

PCT International Search Report for PCT/US02/29093, Holl Technologies Company, completed Mar. 6, 2003, mailed Mar. 17, 2003.

PCT International Search Report for PCT/US02/31076, Holl Technologies Company, completed Dec. 11, 1002, mailed Dec. 27, 2002.

PCT International Search Report for PCT/US02/05361, Holl Technologies Company, completed May 17, 2002, mailed Jun. 5, 2002.

www.pooleplastics.com/production.html, Poole Plastics and Tooling Company, Production Capabilities; Feb. 15, 2001.

Zlotorzynski; "The Application of Microwave Radiation to Analytical and Environmental Chemistry;" Critical Reviews in Analytical Chemistry; vol. 25, No. 1; pp. 43-76; 1995.

"Microwave Heating Mechanisms;" Microwave Chemistry.

"A Basic Introduction to Microwave Chemistry;" Microwave Chemistry.

"Fast and Furious;" Microwave Chemistry.

"Microwave Heating Applied to Polymers;" Microwave Chemistry.

"Application of Microwaves to Organic Chemistry;" Microwave Chemistry.

"Microwave Chemistry in Liquid Media;" Microwave Chemistry.

"Microwave Heating and Intercalation Chemistry;" Microwave Chemistry.

US 6,159,264, 12/2000, Holl (withdrawn)

* cited by examiner

PROCESS FOR HIGH SHEAR GAS-LIQUID REACTIONS

This application is a divisional of and claims the benefit of all prior filing dates claimed in U.S. application Ser. No. 09/894,996, filed Jun. 27, 2001, now U.S. Pat. No. 6,742, 774, herein incorporated by reference in its entirety. U.S. application Ser. No. 09/894,996 claims the benefit of the prior filing date of U.S. Provisional Application No. 60/214, 538, filed Jun. 27, 2000, herein incorporated by reference in its entirety. U.S. application Ser. No. 09/894,996 is also a continuation-in-part and claims priority of U.S. application Ser. No. 09/345,813, filed Jul. 2, 1999, now U.S. Pat. No. 6,391,082; of U.S. application Ser. No. 09/802,037, filed Mar. 7, 2001, now U.S. Pat. No. 6,471,392; and of U.S. application No. 09/853,448, filed May 10, 2001, now U.S. Pat. No. 6,723,999.

This application is a divisional of U.S. application Ser. No. 09/894,996, filed Jun. 27, 2001, which claims the benefit of the prior filing date of U.S. provisional patent application No. 60/214,538, filed Jun. 27, 2000, herein incorporated by reference in their entirety.

BACKGROUND OF THE INVENTION

1. Field of the Invention

The present invention relates to materials processing involving a chemical and/or a physical action(s) or reaction(s) of a component or between components. More specifically, the present invention produces a gas-in-liquid emulsion in a reactor to continuously process relatively large quantities of materials.

2. General Background and State of the Art

Apparatus for materials processing consisting of coaxial cylinders that are rotated relative to one another about a common axis, the materials to be processed being fed into the annular space between the cylinders, are known. For example, U.S. Pat. No. 5,370,999, issued 6 Dec. 1994 to Colorado State University Research Foundation discloses processes for the high shear processing of a fibrous biomass by injecting a slurry thereof into a turbulent Couette flow created in a "high-frequency rotor-stator device", this device having an annular chamber containing a fixed stator equipped with a coaxial toothed ring cooperating with an opposed coaxial toothed ring coupled to the rotor. U.S. Pat. No. 5,430,891, issued 23 Aug. 1994 to Nippon Paint Co., Ltd. discloses processes for continuous emulsion polymerization in which a solution containing the polymerizable material is fed to the annular space between coaxial relatively rotatable cylinders.

U.S. Pat. No. 5,279,463, issued 18 Jan., 1994, and U.S. Pat. No. 5,538,191, issued 23 Jul. 1996, both having the same applicant as the present invention, disclose methods and apparatus for high-shear material treatment, one type of the apparatus consisting of a rotor rotating within a stator to provide an annular flow passage. U.S. Pat. No. 5,538,191, in particular, at column 13, line 37, describes using the invention as a gas/liquid chemical reactor by enveloping the greater part of the liquid that clings to the periphery of the spinning rotor with a body of the reactant gas. The high peripheral velocity of the wetted, spinning rotor causes the gas to be in a highly turbulent state of surface renewal at its contact interface with the liquid film. However, this gas/liquid reaction method provides a relatively small gas/liquid contact area and is prone to considerable back-mixing (mixing in the longitudinal, axial or general flow direction) of the gas component thus providing an undesirably large residence time distribution (RTD), impairing the overall efficiency of the process.

Sparging gasses through liquids for reacting the gasses with the liquids is also known in the prior art, but also fails to provide adequate interfacial contact area between the liquid and gas.

It would be desirable to provide a large interfacial contact area between a liquid and a gas in an efficient continuous or batch type process.

SUMMARY OF THE INVENTION

Accordingly, an object of the present invention is to provide a method and apparatus for producing a gas-in-liquid emulsion for providing increased interfacial contact area between the liquid and the gas for improved reaction of the gas with the liquid, or more rapid solution or reaction of a difficulty soluble or immiscible gas in or with a liquid. This invention provides a superior, more economical and more efficient way of contacting gases with liquids for the purpose of effecting reactions between them to be carried out as a continuous or batch type process.

DETAILED DESCRIPTION OF THE INVENTION

Figure 1:
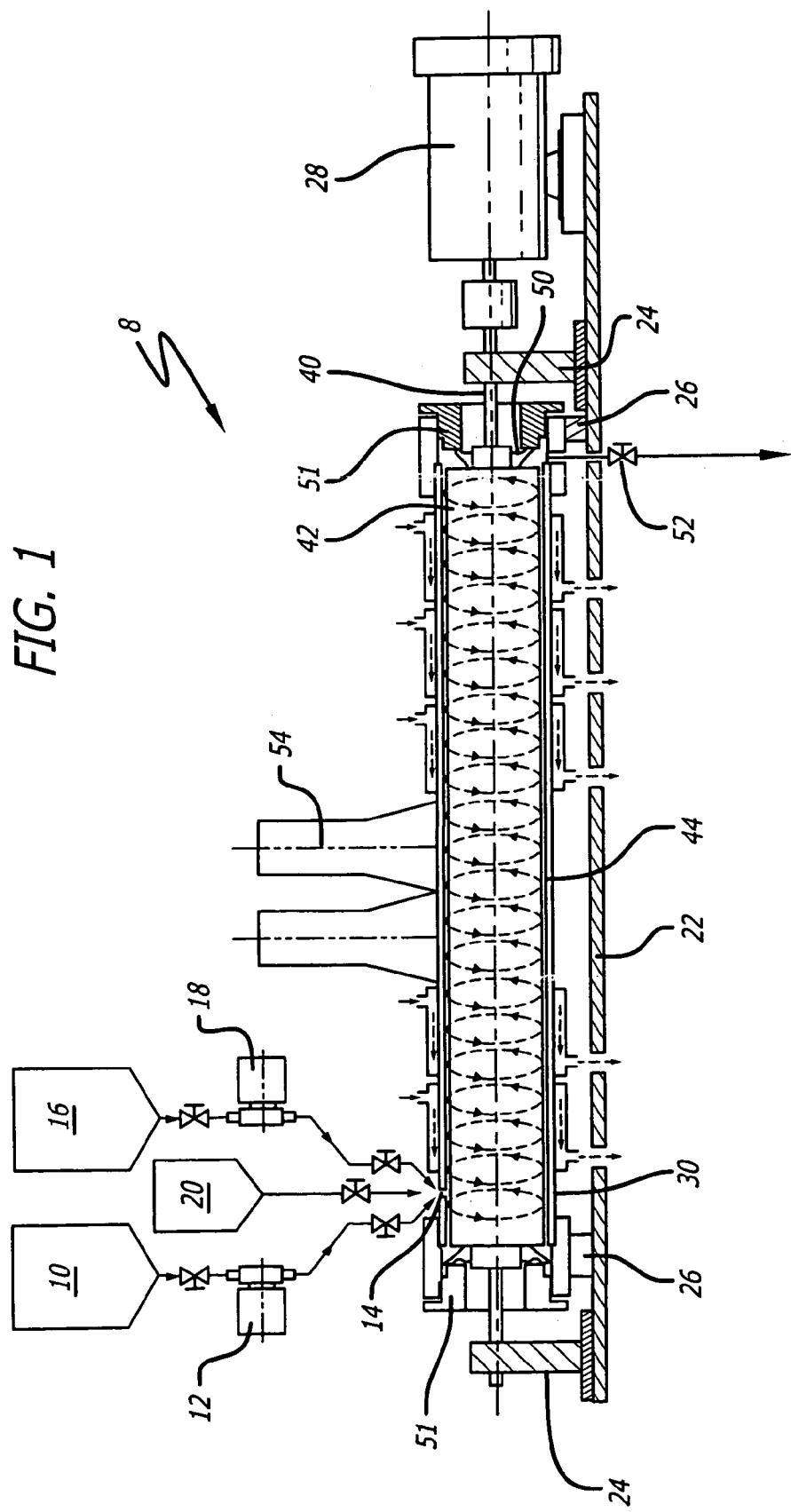
FIG. 1 is a part elevation, part longitudinal cross sectional view of a complete reactor of the present invention.

A reactor 8 is illustrated by FIGS. 1–4, and described in greater detail in U.S. patent Ser. No. 09/802,037 entitled "Method and Apparatus for Materials Processing", filed Mar. 7, 2001 and U.S. Pat. No. 5,538,191 entitled "Methods and Apparatus for High-Shear Material Treatment" both by the applicant of the present invention and both of which are hereby incorporated by reference in their entirety into the present disclosure. An annular cross section processing chamber 44 having an annular gap is formed between an outer cylindrical member or cylindrical tube 30 comprising a stator and a cylindrical rotor or inner cylindrical member 42. Liquid and gas enter the processing chamber 44 through inlets 14. The cylindrical members 30, 42 rotate relative to each other producing a shear force on the liquid, gas and any other reactants as they are pumped through the processing chamber and out an outlet 52 at the downstream end of the processing chamber 44.

Figure 2:
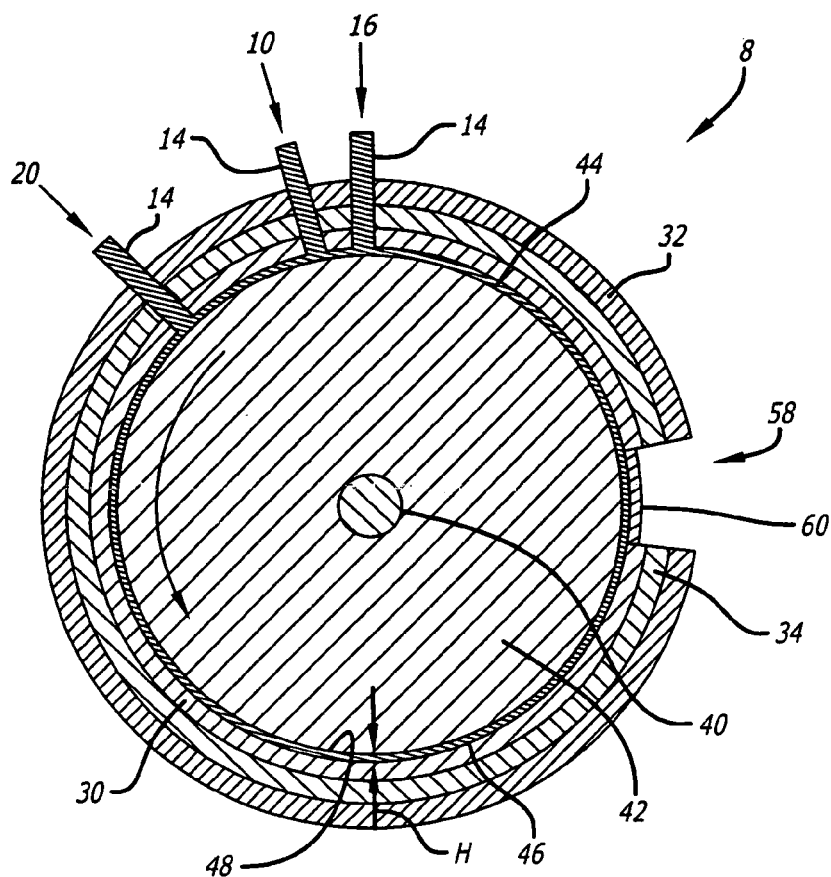
FIG. 2 is a transverse cross-sectional view of a reactor showing the cylindrical members in a concentric configuration with gas and liquid inlets leading to the processing chamber.

Turning to FIGS. 1 and 2 in particular, reactants are fed from supply tanks 10, 16, 20, respectively. Also shown are metering pumps 12 and 18 leading from the supply tanks 10, 16 and into the inlet 14. The reactants can be aqueous solutions and a gas such as carbon dioxide. The reaction can occur at room temperature and atmospheric pressure for example, although other temperatures and pressures can be chosen as appropriate.

The reactor comprises a baseplate 22 on which is mounted rotor bearing supports 24, stator supports 26 and a variable speed electric drive motor 28. The cylindrical member 30, comprising the apparatus stator, is mounted on the supports 24. A rotor shaft 40 extends between the supports 24 and is supported thereby, one end of the shaft being connected to the motor 28. The shaft 40 carries the cylindrical member 42, comprising the apparatus rotor. The processing chamber 44 is formed between the inner cylindrical surface 46 of the cylindrical member 30 and the outer cylindrical surface 48 of rotor 42 and face body 51. The ends of the chamber are closed against leakage by end seals 50 that surround the shaft 40.

In the embodiment of FIGS. 1 and 2 the cylindrical member 42 is shown with its axis of rotation roughly coincident, or concentric, with the longitudinal axis of the cylindrical member 30. The processing chamber 44 is shown having a radial dimension of H.

Figure 3:
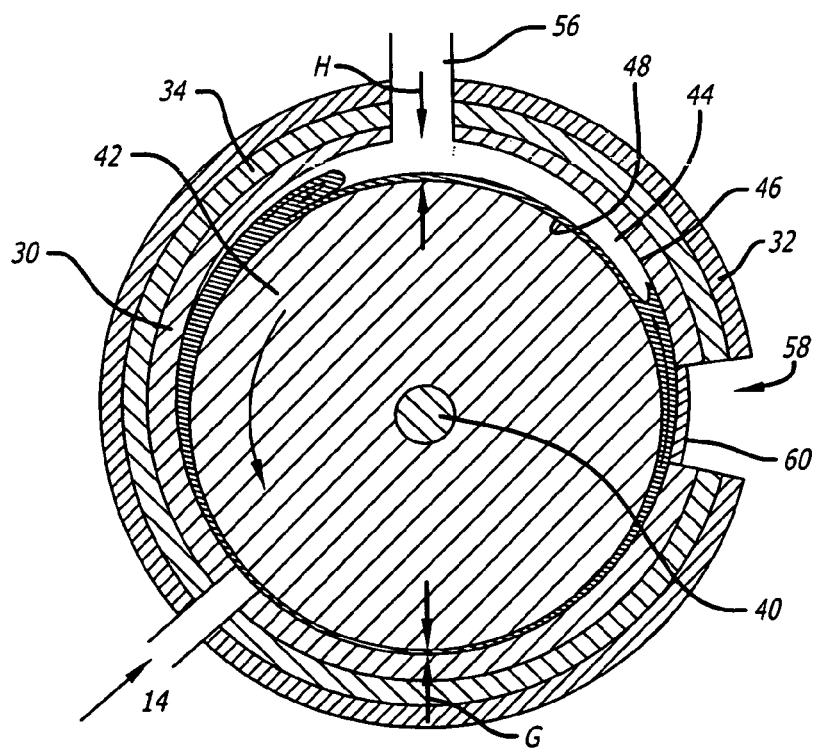
FIG. 3 is a cross-sectional view of an eccentrically mounted embodiment of the reactor in which the longitudinal axes of the cylindrical members are displaced to give an annular passage that varies in radial width around its circumference, the reactor including a series of gas inlets along its length.
Figure 4:
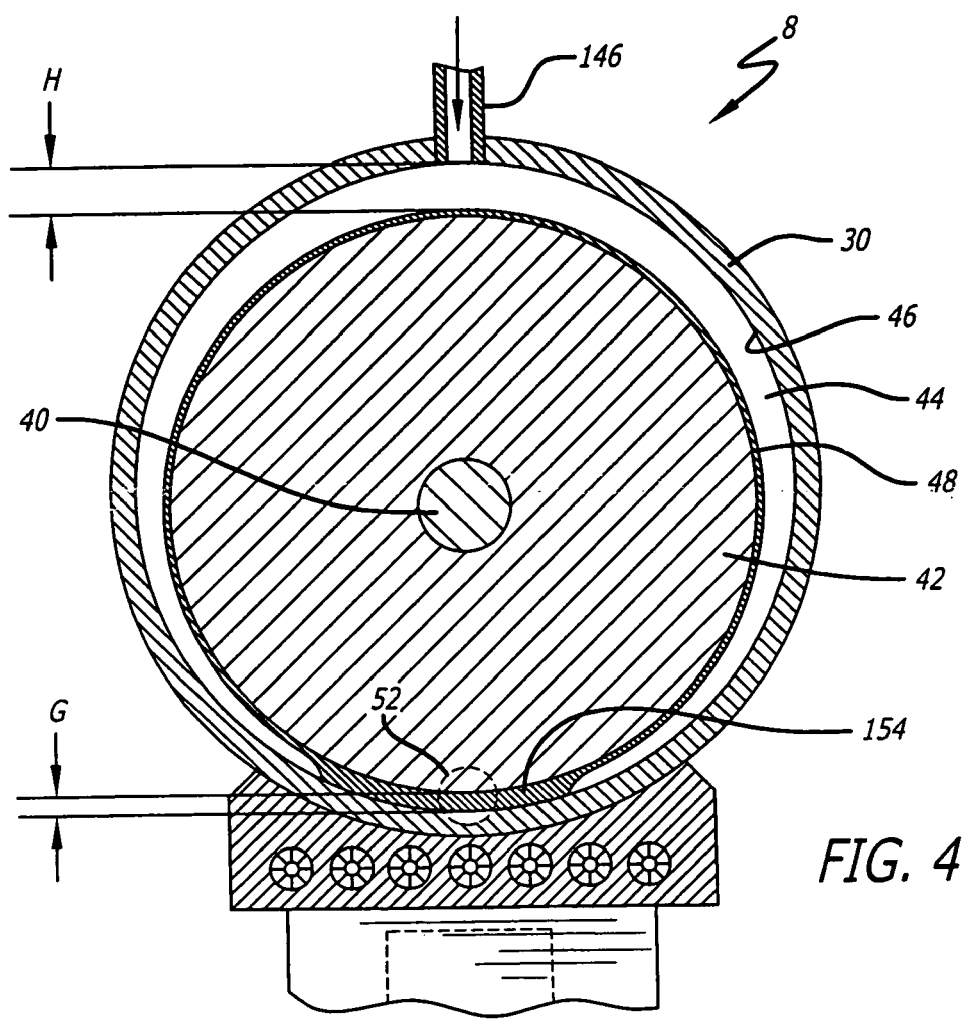
FIG. 4 is a cross sectional view of an eccentrically mounted embodiment of the reactor similar to FIG. 3, but showing a gas inlet at the top of the reactor and fluid inlets along the bottom of the reactor.
Figure 5:
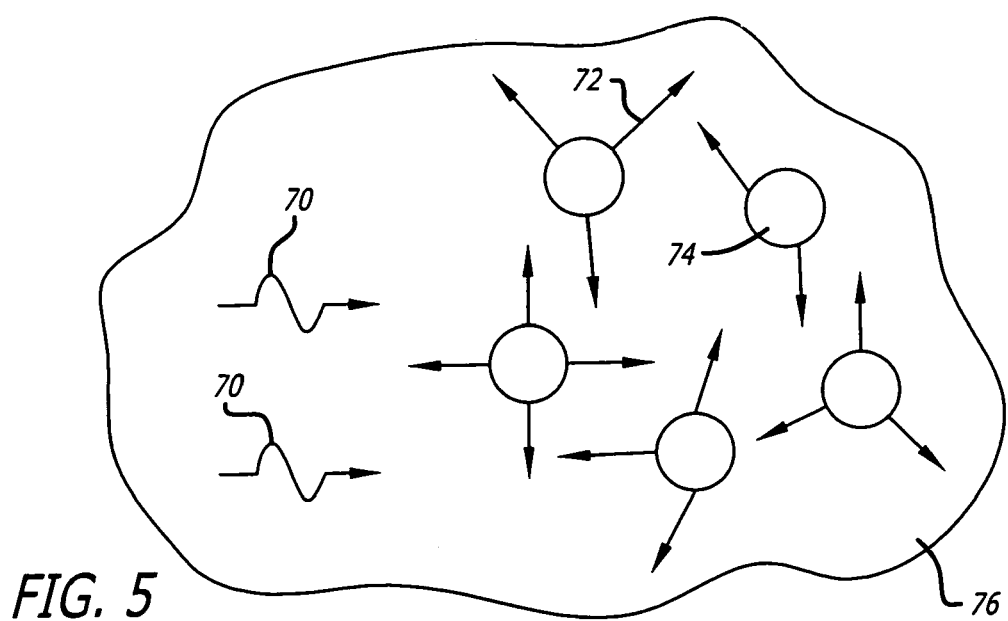
FIG. 5 is a diagrammatic representation of the gas-in-liquid emulsion further illustrating incident white light and light scattered by the gas bubbles.

In another embodiment, as illustrated in FIGS. 3 and 4 for example, the cylindrical member 42 has its axis of rotation not coincident with, but rather eccentric, relative to the longitudinal axis of the cylindrical member 30. The processing chamber 44 has a smaller radial dimension G and a larger radial dimension H diametrically opposite. The processing chamber 44 is therefore circumferentially alternately convergent from the portion having the dimension H to the portion having the dimension G at which portion the surfaces 46, 48 are spaced a minimum distance apart and the maximum shear is obtained in the flowing material; the chamber 44 is then divergent from the portion having the dimension G to the portion having the dimension H.

Rather than the horizontal orientation of FIG. 1, the reactor can be configured vertically with the outlet 52 at the top. Other orientations can be used as well. Also, other inlet and outlet configurations can be used. For example, in FIG. 3 a series of inlets 14 positioned along the length of the reactor 8 and passing through the cylindrical member 30 supply gas into the processing chamber 44. FIG. 4 shows an embodiment in which both the inlet (not shown) and outlet 52 are disposed at the lowermost part of the cylindrical member 30, while the gas is fed into the processing chamber 44 by a separate inlet 146. In a general embodiment, the reactants are pumped into the inlets 14, through the processing chamber 44 and out an outlet. The inlets 14 and outlets 52 can be at opposite ends of the length of the processing chamber 44 to allow mixing and reacting along the length of the processing chamber 44.

U.S. Provisional Application No. 60/214,538 entitled "Process for High Shear Gas-Liquid Reactions" to Holl filed on Jun. 27, 2000, which is hereby incorporated by reference in its entirety into the present disclosure, describes the use of the reactor 8 for gas/liquid reaction. The reactor emulsifies the gas into the liquid providing increased contact between the liquid and gas for more efficient reactions. The inventor of the present invention discovered that a gas-in-liquid emulsification can be created by narrowing the radial dimension between the surfaces 46, 48 of the processing chamber 44 while rapidly rotating the rotor cylindrical member 42 relative to the stator cylindrical member 30.

For the gas-in-liquid emulsification to occur, the radial dimension between the surfaces 46, 48 of the processing chamber 44 should be approximately equal to or less than the combined thickness of the two laminar boundary layers back-to-back. As the material being processed flows in the processing chamber 44 a respective boundary layer forms on each of the surfaces 46 and 48, the thickness of which is determined by the viscosity and other factors of the material being processed and the relative flow velocity of the material over the surface. The laminar boundary layer for a fluid flowing over a flat surface along a path length x, which in the invention is taken as one circumferential flow length around the rotor surface, may be determined by the equation:

$$\delta = \frac{4.91}{\sqrt{N_R}}$$

where $N_{RX}$ is the product of length x and the flow velocity divided by the kinematic viscosity.

In addition to having a radial dimension requirement, the peripheral speed of the rotor cylindrical member 42 relative to the stator cylindrical member 30 should exceed approximately four meters per second for the gas-in-liquid emulsification to occur. The upper limit on the peripheral speed is determined by the application. For example, too great a speed might destroy living microbes or long molecular chains. Also, too great a speed can subject the reactor 8 to unnecessary stress and strain.

The required radial dimension and peripheral speed can vary depending on conditions. The radial dimension requirement and peripheral speed required for the onset of the emulsification phenomenon can be determined experimentally for given reactants under specified conditions. The onset of this emulsification phenomenon is indicated by the appearance of a white colored turbidity of the fluid agitated in the processing chamber 44. The stator cylindrical member 48 can, for observation purposes, be made of glass. The grayish-white to white, almost milk like turbidity supply energy into the processing chamber 44 through a port 58 and window 60 as illustrated in FIGS. 2 and 3. This use of energy is described in greater detail in U.S. patent Ser. No. 09/853,448 entitled "Electromagnetic Wave Assisted Chemical Processing" by Holl filed May 10, 2001 which is hereby incorporated by reference in its entirety into the present disclosure. The energy can also be used in combination with the Taylor-vortices free gas-in-liquid emulsion for additional reaction capabilities.

Also, the cooperating surfaces 46 and 48 in FIGS. 2 and 3 can be coated with a catalyst to facilitate a chemical or biological reaction that constitutes the processing step. The catalytic material can enhance chemical, biochemical or biocidal reactions in the processing passage.

Importantly, the reactor 8 can be quickly and thoroughly cleaned. Therefore, unlike the prior art, deposits forming and blocking the irradiation is not a problem. For example, even if the reactant is a sticky opaque substance, the surfaces 46, 48 and window 60 are easily cleaned. By running the reactor 8 with clean water for enough time for the water to pass from the inlet 14 to the outlet 52, substances clinging to the surfaces 46, 48 and the window 60 are washed away. In most cases the surfaces of the processing chamber 44 are clean within five seconds. This efficient cleaning ability is due to the extremely hard sheer forces as the rotor cylindrical member 42 and stator cylindrical member 30 rotate relative to each other. In most cases, no contaminants will even form on the window 60 or surfaces 46, 48 of the processing chamber 44 due to the hard sheer forces pulling the materials through the reactor 8.

The gas/liquid reaction can be used in an oxygenation process, or an enzyme reaction process for example: Additionally, solids, such as catalytic powders, can be added to the processing chamber 44 to form a gas/liquid/solid emulsion to provide a gas/liquid/solid reaction which can also be enhanced by the applied electromagnetic or longitudinal pressure energy as described below.

Returning to FIG. 3, the illustrated embodiment is intended for an enzyme reaction process, and the axis of rotation of the rotor cylindrical member 42 is eccentrically mounted relative to the longitudinal axis of the stator cylindrical member 30, so that the radial processing chamber 44 differs in dimension circumferentially around the rotor. A heat exchange structure is provided having an outer casing 32 and heat exchange material 34, since such processes usually are exothermic and surplus heat must be removed for optimum operative conditions for the microorganisms. A series of oxygen feed inlets 14 are arranged along the length of the stator and the oxygen fed therein is promptly emulsified into the broth, providing uniformly dispersed, micron-fine bubbles instead of being sparged therein with mm size bubbles of non-uniform distribution, as with conventional enzyme reaction systems. The carbon dioxide that is produced is vented from the upper part of the processing passage through a vent 56. The reactor according to FIG. 3 is designed to operate continuously and provides a continuous and uniform $CO_2$ removal along the upper portion of the rotor which is constantly wetted with a film of broth of uniform mixedness of all ingredients. Also shown is the port 58 and window 60 as described with reference to FIG. 2.

The apparatus of the invention is generically a reactor process and apparatus, and a reactor consists of the vessels used to produce desired products by physical or chemical means, and is frequently the heart of a commercial processing plant. Its configurations, operating characteristics, and underlying engineering principles constitute reactor technology. Besides stoichiometry and kinetics, reactor technology includes requirements for introducing and removing reactants and products, supplying and withdrawing heat, accommodating phase changes and material transfers, assuring efficient contacting among reactants, and providing for catalyst replenishment or regeneration. These issues are taken into account when one translates reaction kinetics and bench-scale data into the design and manufacture of effective pilot plants, and thereafter scale up such plants to larger sized units, and ultimately designs and operates commercial plants.

While the specification describes particular embodiments of the present invention, those of ordinary skill can devise variations of the present invention without departing from the inventive concept.

I claim:

1. An apparatus for providing a large interfacial contact area between one or more liquids and one or more gases, comprising:
    two cylindrical members, at least one of which is mounted for rotation relative to the other, said cylindrical members having opposing surfaces spaced to form an annular processing chamber therebetween providing a flow path for the liquid and gas;
    the annular, processing chamber having a gap distance defined by a distance between the opposing surfaces;
    the cylindrical members in a state of relative rotation at a relative rotation rate;
    the gap distance and relative rotation rate are such as to form a gas-in-liquid emulsion of the one or more gases in the one or more liquids;
    one of the two cylindrical members having a first central axis, and the second of the two cylindrical members having a second central axis, the second central axis located a distance away from the first central axis;
    the one or more liquid and the one or more gases, and any mixture and reaction product thereof form respective laminar boundary layers, and the gap distance being equal to or less than the back-to-back radial thicknesses of the laminar boundary layers;
    the two cylindrical members have opposing surfaces having smoothnesses such that formation of Taylor vortices in the processing chamber is inhibited and the one or more liquids and one or more gases forming the gas-in-liquid emulsion react in the processing chamber.

2. A method for producing a large interfacial contact area between a liquid and a gas, comprising:
    passing a liquid and gas to be processed in a flow path through an annular processing chamber between two cylindrical members at least one of which is mounted for rotation relative to the other, one of the two cylindrical members having a first central axis, a second of the two cylindrical members having a second central axis of rotation, the second central axis spaced apart from the first central axis;
    rotating at least one of the cylindrical members relative to the other fast enough and setting the distance between the facing surfaces of the two cylindrical members small enough so as to form a gas-in-liquid emulsion of the gas in the liquid;
    the liquid and the gas, and any mixture and reaction product thereof form respective laminar boundary layers, and the gap distance being equal to or less than the back-to-back radial thicknesses of the laminar boundary layers;
    the two cylindrical members have opposing surfaces having smoothnesses such that formation of Taylor vortices in the processing chamber is inhibited and if liquid and gas forming the gas-in-liquid emulsion react in the processing chamber.

* * * * *